US012130360B2

(12) United States Patent  (10) Patent No.: US 12,130,360 B2
Leone et al.  (45) Date of Patent: Oct. 29, 2024

(54) ULTRASOUND TRANSMITTER DEVICE FOR DRIVING PIEZOELECTRIC TRANSDUCERS

(71) Applicant: STMicroelectronics S.r.l., Agrate Brianza (IT)

(72) Inventors: Antonio Davide Leone, Siziano (IT); Vanni Poletto, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 10 days.

(21) Appl. No.: 18/178,110

(22) Filed: Mar. 3, 2023

(65) Prior Publication Data

US 2023/0296769 A1  Sep. 21, 2023

(30) Foreign Application Priority Data

Mar. 18, 2022  (IT) .................... 102022000005384

(51) Int. Cl.
| | |
|---|---|
| *G01S 7/521* | (2006.01) |
| *G01S 7/524* | (2006.01) |
| *G01S 15/93* | (2020.01) |
| *G01S 15/931* | (2020.01) |
| G01S 7/52 | (2006.01) |
| H04R 17/00 | (2006.01) |

(52) U.S. Cl.
CPC ............ *G01S 15/931* (2013.01); *G01S 7/521* (2013.01); *G01S 7/524* (2013.01); *G01S 2007/52007* (2013.01); *G01S 2015/937* (2013.01); *H04R 17/00* (2013.01)

(58) Field of Classification Search
CPC ........... A61B 8/54; A61B 8/56; B06B 1/0207; B06B 1/0215; B06B 1/06; G01S 7/521; G01S 7/523; G01S 7/524; G01S 2007/52007; G01S 15/10; G01S 15/102; G01S 15/931; G01S 2015/937; H04R 17/00

See application file for complete search history.

(56) References Cited

U.S. PATENT DOCUMENTS

| | | |
|---|---|---|
| 3,919,655 A | 11/1975 | Crandall |
| 2003/0164658 A1 | 9/2003 | Saraf |
| 2004/0158147 A1 | 8/2004 | Shifrin |

FOREIGN PATENT DOCUMENTS

JP  2008237280 A  10/2008

*Primary Examiner* — Levi Gannon
(74) *Attorney, Agent, or Firm* — Slater Matsil, LLP

(57) ABSTRACT

In accordance with an embodiment, an ultrasound transmitter device includes a transformer comprising a secondary winding configured to be coupled to a piezoelectric transducer; a plurality of transistors coupled to the primary winding of the transformer and to a ground terminal via a sense resistor; an amplifier having an output coupled to control nodes of the plurality of transistors, a first input coupled to the sense resistor, and second input coupled to a reference resistor; a switching circuit configured to alternately couple control nodes of the plurality of transistors to an output of amplifier and to a reference node via complementary pulse signals, wherein the switching circuit is configured to turn on and turn off the plurality of transistors and operate the plurality of transistors in a push-pull manner; and a digital-to-analog converter having an output coupled to the reference resistor.

20 Claims, 3 Drawing Sheets

ULTRASOUND TRANSMITTER DEVICE FOR DRIVING PIEZOELECTRIC TRANSDUCERS

CROSS-REFERENCE TO RELATED APPLICATIONS

This application claims the benefit of Italian Patent Application No. 102022000005384, filed on Mar. 18, 2022, which application is hereby incorporated herein by reference.

TECHNICAL FIELD

The present disclosure relates to an ultrasound transmitter device for driving piezoelectric transducers.

BACKGROUND

By stimulating of a piezoelectric transducer, it is possible to transmit acoustic waves, in particular ultrasound waves, which can be detected by the transducer itself in order to recognize obstacles. The increase in the distance of transmission and the use of specific modulations enable an increase of the performance of ADAS (Advanced Driver Assistance Systems) applications for the automotive market. Evolution of basic systems already present on the market makes it possible to pass from diagnostics to assisted/automatic driving.

Ultrasonic systems are configured to manage problems of environmental interference and interference from systems of adjacent vehicles. For example, wind and rain may attenuate and disturb the signal transmitted, while pulses coming from adjacent vehicles may give rise to erroneous diagnostics and recognition. Hence, to render the signal more recognizable during reception, the transmitted signal may be modulated (e.g., for distances greater than one meter).

It is, however, difficult to provide a system capable of recognizing simultaneously objects that are far away and objects that are near.

Reaching great distances of detection implies using high current levels in the stimulation of the piezoelectric transducer. It is useful to have a good efficiency of transmission to facilitate operation of the reception stage. Detecting obstacles that are very close means reducing current with which the transducer is stimulated to prevent saturation of the reception stage.

Present on the market are various ultrasonic systems for obstacle recognition that implement known solutions to achieve the current levels of performance. Such systems are costly and present limitations in their performance.

SUMMARY

One or more embodiments may be directed to a corresponding ultrasonic detector, as well as a corresponding method.

As mentioned previously, the present disclosure describes embodiments regarding an ultrasound transmitter device for driving piezoelectric transducers comprising a central-tap transformer and a piezoelectric transducer coupled to the terminals of the secondary output winding of the central-tap transformer from which it receives a controlled current. The central-tap transformer may include a primary winding comprising terminals at the ends the primary winding and a central terminal, the central terminal being coupled to a constant dc voltage, in particular a battery voltage, the end terminals being coupled, via respective transistors, in particular MOSFETs, to a ground voltage, the transistors being driven into their own states of conduction and inhibition by respective complementary pulse sequences. In an embodiment, the transistors are coupled to the ground terminal through a sense resistance; the transmitter device comprises a digital-to-analog converter, which supplies an analog current to a driving amplifier, which in turn supplies a driving current to the transistors; the output of the digital-to-analog converter is coupled to an input terminal of the driving amplifier, which is also coupled to the ground terminal through a reference resistance that has a value proportional to, in particular a multiple or a divisor of, the value of the sense resistance; and the sense resistance is coupled to the other input terminal of the driving amplifier.

In various embodiments, the output of the driving amplifier is coupled in parallel, through respective switches, to respective control electrodes, in particular gate electrodes, of the transistors, the complementary pulse sequences being supplied as control signals of the respective switches.

In various embodiments, the complementary pulse sequences comprise overlapping time intervals during which the complementary pulse sequences have the same logic value, in particular corresponding to a closed state of the respective switches, and during which the complementary pulse sequences are supplied by an overlap-control module, configured for controlling the pulse-overlap time at one and the same value in the two sequences.

Embodiments of the present disclosure also relate an ultrasonic obstacle detector comprising an ultrasound pulse transmitter device according to various embodiments.

Embodiments of the present disclosure also relate to a method for controlling an ultrasound transmitter device according to various embodiments that envisages determining the flowing flow of a current with controlled value in the piezoelectric transducer by setting a digital value of current at input to the digital-to-analog converter.

In various embodiments, during an operating cycle of the piezoelectric transducer a plurality of different digital current values is set in time. In various embodiments, the overlap time of the complementary pulses is controlled via the overlap-control module.

One or more embodiments provide one or more of the following advantages: symmetry independent of the external components; good accuracy; compact implementation; and additional functions for controlling the overlap and shape of the current. Some embodiments advantageously provide high performance both for high currents and for low currents using the same circuitry.

BRIEF DESCRIPTION OF THE DRAWINGS

One or more embodiments will now be described, purely by way of non-limiting example, with reference to the annexed drawings, wherein.

DETAILED DESCRIPTION OF ILLUSTRATIVE EMBODIMENTS

In the ensuing description, various specific details are illustrated in order to enable an in-depth understanding of various examples of embodiments according to the description. The embodiments may be obtained without one or more of the specific details, or with other methods, components, materials, etc. In other cases, known structures, materials, or operations are not illustrated or described in detail so that the various aspects of the embodiments will not be obscured. Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of the present description do not necessarily refer exactly to the same embodiment. Moreover, particular conformations, structures, or characteristics may be combined in any adequate way in one or more embodiments.

Some embodiments of the present disclosure relate to an ultrasound transmitter device for driving piezoelectric transducers. One or more embodiments may regard ultrasonic obstacle detectors. The references used herein are provided merely for convenience and hence do not limit the sphere of protection or the scope of the embodiments.

Figure 1:
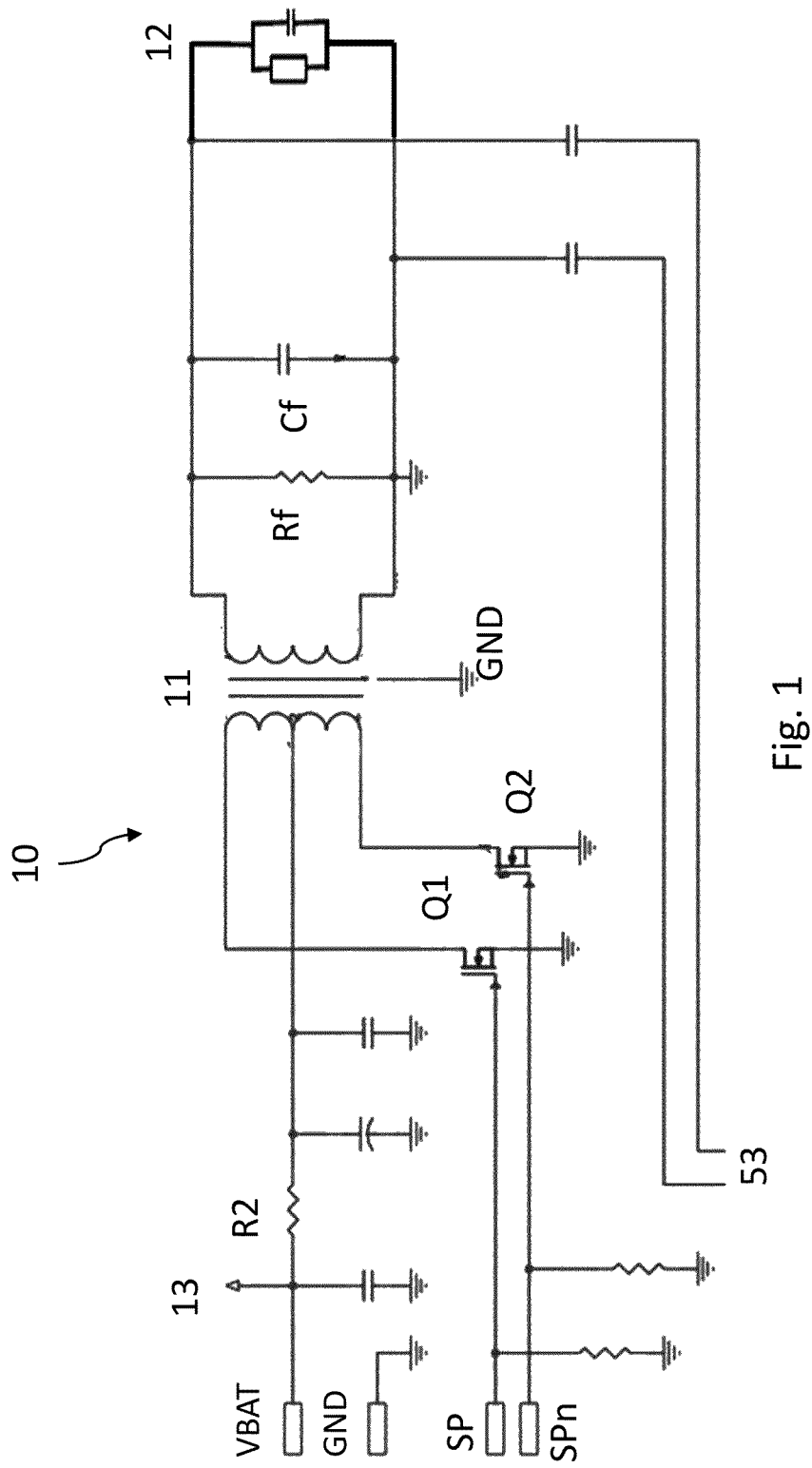
FIG. 1 illustrates a circuit that uses a central-tap transformer for driving a piezoelectric transducer at high voltages.

Some conventional embodiments use a central-tap transformer for driving a piezoelectric transducer at high voltages. Illustrated schematically in FIG. 1 is a circuit exemplifying such an embodiment, designated as a whole by 10, in which a central-tap transformer 11 has a piezoelectric transducer 12 coupled to the terminals of the secondary winding. Also represented in the figure is coupling of the piezoelectric transducer 12 to a receiver 53, described more fully with reference to FIG. 3B in what follows. The essential components of FIG. 1 are here described briefly to enable understanding of operation of conventional implementations.

Through a battery 13 that supplies a constant dc voltage VBAT, which corresponds to a power supply voltage of 12 V, a central tap DRVC of a transformer 11 is, for example, supplied, while the other two ends DRV1 and DRV2 are alternatively shorted to ground GND by respective transistors Q1 and Q2 coupled thereto operating in push-pull mode, which are power MOSFETs. Complementary pulse sequences SP and SPn, e.g., of pulses having opposite logic levels at the same instant, are supplied by a pulse generator (not illustrated) to the control electrodes of the push-pull transistors Q1 and Q2 so as to bring about opposite open and closed states, e.g., so as to get them to operate in push-pull mode. In this way, the current flows alternatively in the two branches associated to the terminals DRV1, DRVC and DRV2, DRVC, coupling, in two opposite directions, to the secondary winding of the transformer 11, where also shown is an RC filter formed by a filter resistance Rf and a filter capacitor Cf. Hence, a sinusoidal waveform (given that the filter is an intrinsic filter with a high resonance coefficient Q) is generated on the load, e.g., the piezoelectric transducer 12.

The amplitude of the voltage on the piezoelectric 12 depends upon the level of current that flows in the branches of the primary of the transformer 11.

The simplest implementation envisages limitation of the current value through a series resistance, such as the resistance R2 in FIG. 1, between the battery voltage VBAT and the central tap DRVC of the transformer 11.

Alternatively, a series of pulses may be generated with the possibility of controlling the power transmitted through the duty cycle. While such systems are straightforward to implement, they may not enable precise regulation of the transmitted power, which to a first approximation depends upon the current that passes in the transducer.

According to the piezoelectric crystal being used, it is possible to maximize the current/pressure efficiency through an overlap control, e.g., a control of overlapping of the pulsed currents transmitted by the two MOSFETs. For instance, if the currents that flow in the two branches overlap for an overlap time interval that forms a part of the respective duty cycle, the current/pressure efficiency of the piezoelectric, in types of piezoelectric crystal or PMUT (Piezoelectric Micromachined Ultrasound Transducer), remains constant up to given values of overlap time interval, and then drops sharply when the time overlap interval exceeds the given values. Overlap of currents in the two branches may lead to a loss of efficiency and, given the inductances involved, may cause voltage spikes.

It is, however, difficult to control overlap of the two MOSFETs operating in push-pull mode, e.g., the period during which they remain simultaneously on, since the current value is not known beforehand given that it is dependent upon the process (it does not maximize efficiency in transmission). The implementation renders transmission asymmetrical since it is unable to control beforehand the level of current in the two branches, which depends upon the MOSFETs used and upon the external componentry.

An evolution of the system envisages regulation of the current through a generator set in series to the two MOSFETs. Standard implementations may be represented by a series of current branches to be selected to obtain the desired level or else a DAC with a power output. In the latter case, the drain-to-source on resistance, RDSon, of the pulser is markedly dependent upon the current generator (DAC), and the implementation involves a higher occupation of area. Providing a power DAC that is effective both at high currents and at low currents may be very complex in terms of linearity.

Figure 2:
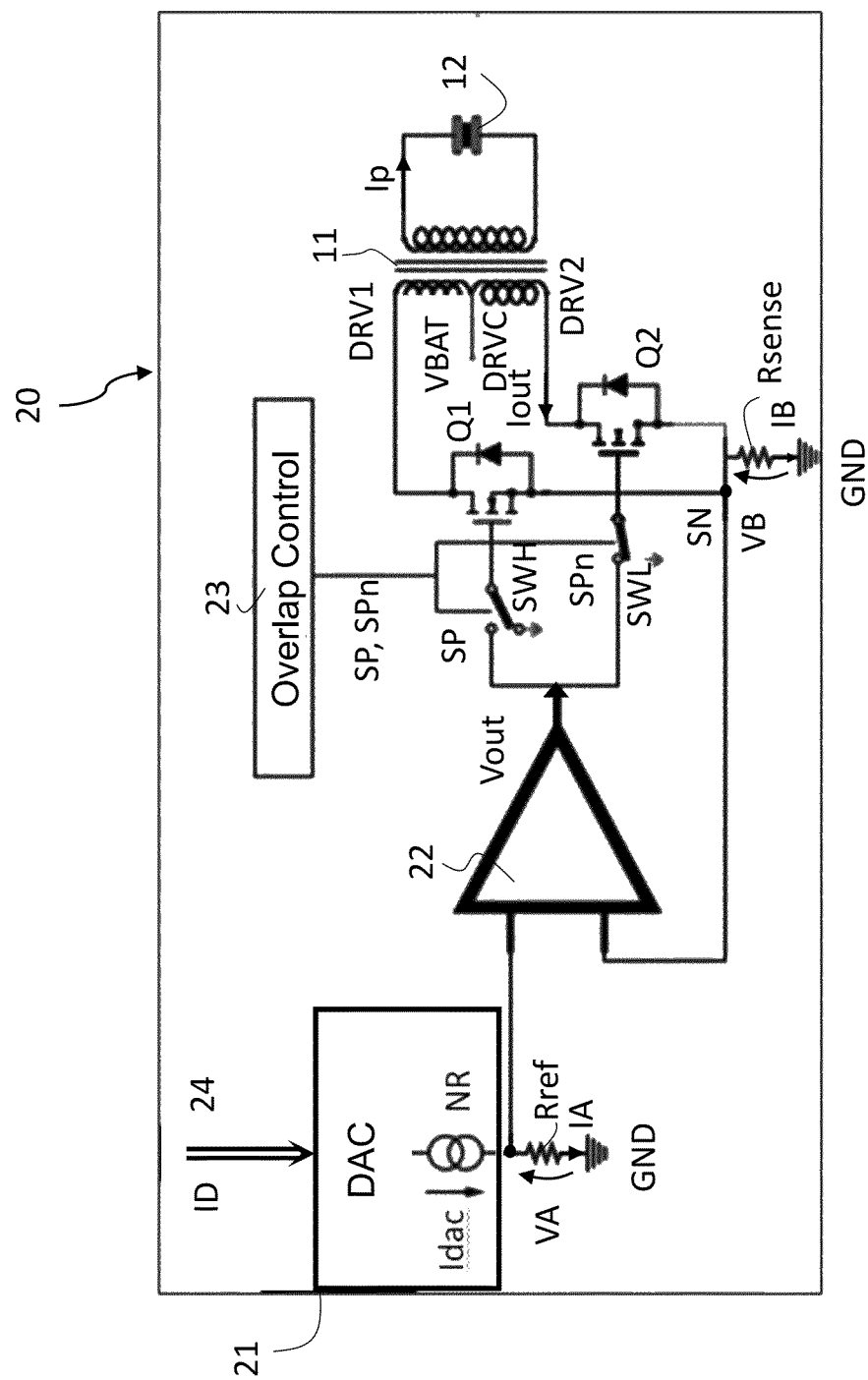
FIG. 2 is a schematic representation of a device according to embodiments described herein.

FIG. 2 is a schematic illustration of an ultrasound transmitter device for driving piezoelectric transducers according to embodiments described herein, designated as a whole by the reference number 20. The central-tap transformer 11 receives a battery voltage VBAT on its own central tap DRVC of the primary winding. The transformer 11 is coupled, via its own terminals of the secondary winding, to the piezoelectric transducer 12. The terminals DRV1 and DRV2 are coupled, via push-pull MOSFETs Q1 and Q2, to a terminal SN of a sense resistance Rsense, which is in turn coupled, via the other one of its terminals, to a ground terminal GND.

Some embodiments advantageously allow for rapid switching of two transmission power transistors, in particular power MOSFETs. For example, in an embodiment, the level of current supplied to the central tap of the transformer 11 is controlled via a sense resistance Rsense of very small dimensions (e.g., in particular small as compared to a power DAC). Embodiments may further exploit a resistance that is a multiple of the sense resistance by a given number N of times in order to provide a resistance reference Rref with which to select the transmitted power.

In accordance with an embodiment, a digital-to-analog converter 21 receives, from a component represented schematically as a bus 24 operating with a certain number of bits, for example 10 bits, a digital value ID that represents the analog output current of the DAC Idac at the input terminal, represented by a node NR, of an operational amplifier 22, which is also coupled to the ground terminal GND via a reference resistance Rref, the value of which is proportional, by a factor N, preferably an integer, to the value of the sense resistance Rsense. The operational amplifier 22 is coupled to the sense terminal SN via the other one of its input terminals. The output of the operational amplifier 22 is supplied as driving signal to both of the control electrodes, in particular the gate electrodes, of the pull-push MOSFETs Q1 and Q2. Set between the output of the operational amplifier 22 and the control electrodes, in particular the gate electrodes, of the pull-push MOSFETs Q1 and Q2 are respective switches SWH and SWL, which are themselves, for example, obtained using MOSFETs, which are driven into their open and closed states by an overlap-control unit 23, which supplies complementary pulse sequences SP, SPn, e.g., sequences of opening and closing signals; for example, each opening and closing signal is a square-wave signal with variable duty cycle. It should be noted that by "pulse sequence" is here meant, for example, a sequence of a PWM (Pulse Width Modulation) type with variable duty cycle, even beyond 50%, as described in what follows.

Hence, the operational amplifier 22 acts as the same driving circuit, which drives both of the push-pull MOSFETs Q1 and Q2, and enables an overlap control that maximizes the performance of actuation.

The operational amplifier 22 is configured for controlling the gate-to-source voltage of the pull-push MOSFETs Q1 and Q2 to carry out a pulse modulation of a controlled current Ip that flows in the piezoelectric transducer 12, through the central-tap transformer 11. The controlled current Ip has a value that is proportional to the one defined by the DAC 21 and is multiplied by the ratio between the sense resistance Rsense and the reference resistance Rref, hence 1/N.

The operational amplifier 22 supplies output voltage Vout, which, according to which of the switches SWH, SWL on the gates of the two MOSFETs Q1 and Q2 is closed in order to couple the output of the operational amplifier 22 to the respective MOSFET Q1 or Q2, determines an output current Iout, which flows in one of the two branches, DRV1, DRV2 of the primary of the transformer 11. In FIG. 2, the output current Iout is represented as flowing in the branch DRV2 of the MOSFET Q2 in so far as the switch SWL is represented closed, but the switch SWH may conversely be closed, in which case the output current Iout flows in the branch DRV1, or else, as described more fully in what follows, with both switches SWH, SWL on the gates of the two MOSFETs Q1 and Q2 closed, the current Iout flows in a shared way in both of the branches DRV1, DRV2.

The overlap-control unit 23 carries out overlap control of the output current Iout in the two branches between the output of the operational amplifier 22 and, respectively, the MOSFETs Q1 and Q2, interposed on which are the respective switches SWH and SWL, the aim being to maximize the transmission performance. By keeping the two switches SWH and SWL coupled to the gates of the MOSFETs Q1 and Q2 that regulate the controlled current Ip simultaneously on, the output current Iout is shared on both of the branches corresponding to the switches SWH and SWL, through both of the MOSFETs Q1 and Q2, for an overlap time imposed by the overlap-control unit 23. Overlap-control unit 23 may be implemented, for example, using overlapping signal generation circuits known in the art. For example, overlap-control unit 23 may be implemented using a clocked state machine, or may be implemented by using inverted outputs of a well-known non-overlapping clock generation circuits (e.g., a cross-coupled latch circuit).

The operational amplifier 22 can be used to modify the shape of current in the transducer 12. This allows for selective adjustment of the steady-state accuracy or speed required to reach an adequate minimum value. The internal frequency compensation can be varied by changing the value of compensation capacitance (by adding or removing capacitances in parallel). For example, reducing the value of compensation capacitance of the amplifier 22 can make the rising edges of the currents Iout, Ip steeper.

Furthermore, the use of the operational amplifier 22 enables the current to be shared in the two branches irrespective of any mismatch of threshold voltage Vth1, Vth2 of the two MOSFETs Q1 and Q2, thanks to the virtual ground of the operational amplifier 22. A voltage drop VA occurs across reference resistance Rref that is equal to VB, where VB is the voltage drop on the sense resistance Rsense.

The output current of the DAC Idac is determined by the digital selection of the code corresponding to the digital value Id at input to the DAC 21. The selection may be made with a coding chosen at will.

The current IA that flows in the reference resistance Rref is proportional to the current IB that flows in the sense resistance, where IB=N·IA. Hence, the digital value ID at input to the DAC 21, which determines the analog output current of the DAC Idac, is divided or multiplied to obtain the final current value IA that flows in the reference resistance Rref.

In an embodiment, a constant current value is selected for the time necessary to transmit the desired amplitude. The current value is changed also during transmission to increase or reduce the amplitude of the signal transmitted on the transducer 12, where $$\text{Iout}=N\cdot \text{Idac}=\text{Idac}\cdot \text{Rref}/\text{Rsense; and}$$

$$\text{Idac}=\text{ID}\cdot \text{Iref}.$$

DAC 21 provides a current output, and may be implemented using a variety of architectures. For example, DAC 21 may be implemented using switchable additive and subtractive current mirrors coupled to an output node. The DAC 21 may be implemented, for example, using low-voltage components.

Corresponding to each current level is a different voltage value that develops on the regulation node SN:
 a low current value implies a lower power of actuation of the piezoelectric transducer 12;
 a high current value implies a high power of actuation of the piezoelectric transducer 12.

It is possible to create different driving profiles as a function of the distance at which the transducer 12 is to operate and to regulate via the digital value ID supplied to the DAC 21 the controlled current Ip on a number of levels over a given time period, corresponding to an operating cycle, to be able to cover different distances.

For instance, in the case of a distant obstacle, it is possible to increase the transmitted power gradually by increasing the controlled current Ip transmitted until the receiver is able to detect an obstacle. The power can subsequently be increased and reduced according to whether the echo is received more or less intensely. The circuit described enables this to be obtained via instantaneous modifications of the digital value ID supplied to the DAC 21, for example via a microcontroller.

Hence, a digital combination (e.g., a digital value of current ID) at the input to the DAC 21 is used to reduce or increase the controlled current Ip. Purely by way of non-limiting example, a digital current value ID is sent at input to the DAC 21 with only the LSB (Least Significant Bit) at 1, for a level of current Idac, hence Ip, of minimum value, and with all the bits at 1 for a level of current Idac, hence Ip, of maximum value.

The current IB in the sense resistance Rsense depends only upon the value of voltage VA present between the reference node NR and ground GND.

At the instant when both of the switches SWH, SWL are simultaneously closed, the output current Iout is shared in the two push-pull MOSFETs Q1 and Q2 in a substantially equal amount; that is, for the entire time during which the overlap-control unit 23 keeps the two switches SWH, SWL simultaneously closed, the current in each branch corresponds to IB/2, (e.g., half of the sense current IB that flows in the sense resistance Rsense).

When the switches SWH, SWL change state, so that switch one remains in the closed state while the others switch goes into the open state, the current IB/2 in the branch corresponding to the latter switch vanishes, and all the sense current IB flows in the other branch corresponding to the closed switch.

Passage of current from one branch to the other occurs gradually due to the regulation of the gate-to-source voltage performed by the amplifier 22, which first regulates the gate-to-source voltage VGS of a single push-pull MOSFET (e.g., Q1) then regulates both of the gate-to-source voltages (e.g., those corresponding to the MOSFETs Q1 and Q2 closed together), and then once again regulates just one of them (e.g., the gate-to-source voltage VGS of the MOSFET Q2).

At the end of the transition, the value of current, equal to the sense current IB, that was present on one branch will be present on the other branch irrespective of the value of threshold voltage Vth of the push-pull MOSFETs Q1 and Q2, since the value of the current depends only upon the voltage VA on the regulation node NR. Accordingly, the pulse is symmetrical irrespective of any technological mismatch of the push-pull MOSFETs Q1, Q2.

FIG. 2 illustrates an ultrasound transmitter device for driving piezoelectric transducers 20, which comprises a central-tap transformer 11 and a piezoelectric transducer 12 coupled to the terminals of the output secondary winding of the central-tap transformer 11 from which it receives a controlled current Ip to regulate the actuation power thereof.

Central-tap transformer 11 comprises a primary winding, which includes terminals DRV1, DRV2 at the ends of the primary winding and a central terminal DRVC that is coupled to a constant dc voltage, in particular a battery voltage VBAT of the motor vehicle. End terminals DRV1, DRV2 are coupled, through respective transistors Q1, Q2 (e.g., MOSFETs or power MOSFETs) to a ground voltage GND, and the transistors Q1, Q2 are driven into their own open and closed states by respective complementary pulse sequences SP, SPn that may be sequences of pulses that have prevalently different values, though it is possible for a non-zero overlap interval to be defined in which they assume the same value in some embodiments. The transistors Q1, Q2 operating in push-pull mode are coupled to the ground terminal GND through a sense resistance Rsense.

As shown, the transmitter device 20 includes a digital-to-analog converter 21, which supplies an analog current Idac to a driving amplifier 22, for example obtained via an operational amplifier, which drives the flow of a driving current Iout—in particular by imposing on the sense resistance Rsense a voltage drop VB equal to the voltage drop VA on the reference resistance Rref, VA=VB, where VB is the voltage drop on the sense resistance Rsense—in the above transistors Q1, Q2 operating in push-pull mode, in particular by controlling their gate-to-source voltage. The output of the digital-to-analog converter is coupled to an input terminal NR of the driving amplifier 22, which is also coupled to the ground terminal GND through a reference resistance Rref, which has a value, N, that is proportional to, in particular a multiple or a divisor of, the value of the sense resistance Rsense, which is finally coupled to the other input terminal of the driving amplifier 22.

Using the above circuit arrangement, it is possible to carry out a current control via a sense resistance of very small dimensions with respect to a power DAC and exploit a resistance N times greater to provide a reference with which to select the power transmitted by the piezoelectric 12.

Moreover, the output of the driving amplifier 22 is coupled in parallel, via respective switches SWH, SWL, to respective control electrodes, in particular gate electrodes, of the transistors operating in push-pull mode Q1, Q2, the complementary pulse sequences SP, SPn being supplied as control signals of the respective switches. Accordingly, the same driver may be used for driving both of the power transmission MOSFETs, where the virtual ground of the operational amplifier renders operation independent of the threshold voltages of the push-pull transistors Q1, Q2.

Furthermore, the complementary pulse sequences SP, SPn comprise overlap time intervals having the same logic value corresponding to a closed state of the respective switches SWH, SWL. Complementary pulse sequences SP, SPn are supplied by an overlap-control module 23, configured for controlling the pulse-overlap time to have same value in the two sequences. Hence, the overlap time is a time interval during which the complementary pulses SP and SPn have the same value, in particular the same value that drives the switches SWH and SWL into the closed state and the MOSFETs Q1, Q2 into conduction. By using the same driver for driving both of the power transmission MOSFETs, is to provide an overlap control that can maximize the performance of actuation of the piezoelectric 12.

Hence, a method for controlling the ultrasound pulse transmitter device 20 may comprise determining a controlled value of current Ip that flows in the piezoelectric transducer 12 in order to regulate the power by setting a digital current value ID at input to the digital-to-analog converter 21.

Furthermore, a method for controlling the ultrasound pulse transmitter device 20 may comprise, during an operating cycle of the piezoelectric transducer (e.g., an obstacle-detection cycle) in which obstacles at different distances are detected in the same interval, setting a plurality of different digital values ID at different times.

Moreover, a method for controlling the ultrasound pulse transmitter device 20 may comprise controlling the overlap time of the complementary pulses via the overlap-control module 23 to optimize the operating power. Overlap-control module 23 may be configured, for example, for supplying the respective complementary pulse sequences SP, SPn, (e.g., sequences of opening and closing signals) to the switches SWH and SWL. Each opening and closing signal may be a square-wave signal or a PWM signal with variable duty cycle. The complementary pulse sequences SP, SPn of the switch SWH and of the switch SWL have a duty cycle of 50% and be complementary to one another. For example, when the pulses sequence SP of the switch SWH is a closing command (e.g., a high logic level) the complementary pulse sequence SPn of the switch SWL is an opening command (e.g., a low logic level). Alternatively, the overlap-control module 23 can determine an overlap time interval, around the instant of switching from closing to opening of one switch and of switching from opening to closing of the other switch, where both the switches SWH, SWL are driven into the closed state (e.g., they both receive a high logic level). This overlap interval may, for example, be 10% of the period, for example, the pulse sequence SP of the switch SWH keeps the latter in the closed state from 0% to 60% of the period of the sequence SP itself, whereas the complementary pulse sequence SPn of the switch SWL keeps the latter in the closed state from 40% to 100% of the period of the complementary sequence SPn of the switch SWL itself. The duration of the overlap interval can be controlled by the overlap-control module 23 according to the characteristics of the transducer and to the value of pressure of the piezoelectric transducer that is to be obtained.

Figure 3A:
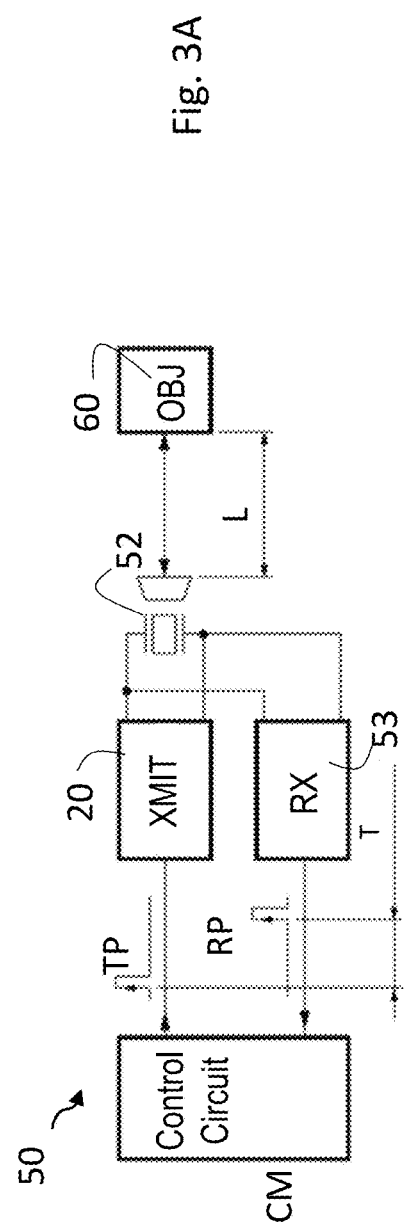
FIGS. 3A and 3B are schematic representations of an ultrasonic obstacle detector that uses the device according to embodiments described herein.

Illustrated in FIG. 3A is an ultrasonic obstacle detector 50, which comprises a pulse transmitter 20 as described with reference to FIG. 2, that drives the piezoelectric transducer 12, which is an ultrasound transceiver, under the control of the transmission pulse TP sent by the control circuit CM, for emitting ultrasound pulses, e.g., pressure-wave pulses.

An object 60 located at a distance L reflects the ultrasound waves associated with the ultrasound pulse, which are detected by the piezoelectric transducer 12 itself, the output of which is sent to a receiver circuit 53, which sends a reception control pulse RP to the control circuit CM, which measures the difference in time T between the transmission control pulse TP and the reception control pulse RP. The difference in time T is also referred to as "time of flight" and, knowing the speed of propagation of the ultrasound pulse, it is possible to determine the distance L.

Figure 3B:
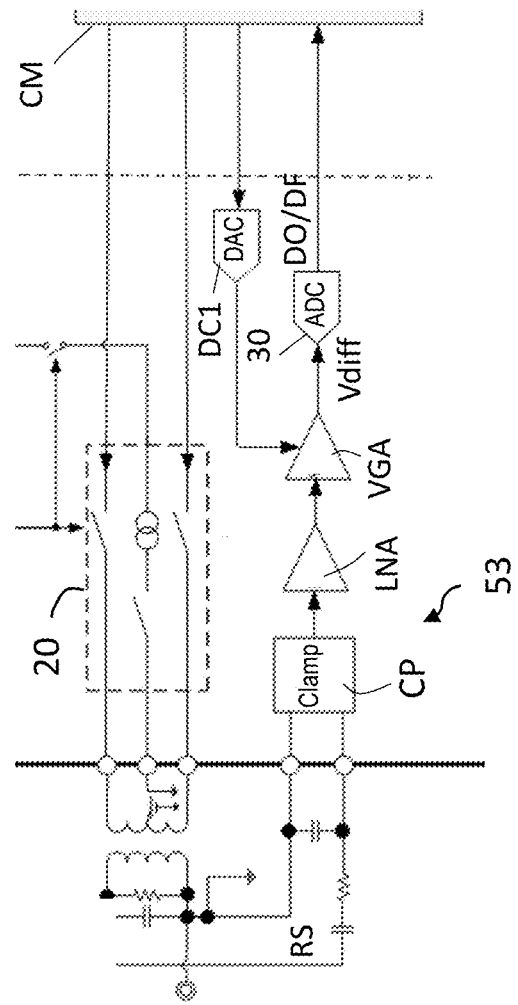

Illustrated in FIG. 3B is a partial block diagram of the ultrasonic obstacle detector 50 comprising the transducer 12, represented schematically as a parallel RC pair, which is driven by the pulse transmitter 20, coupled thereto by a transformer. The transducer 12 is coupled for reception to the receiver circuit 53, which in turn comprises an analog-to-digital converter (ADC) 30. Consequently, as illustrated in FIG. 3B, an ultrasound signal RS received, which is an analog differential signal, is transmitted by a chain of signals comprising a clamp circuit CP, followed by a low-noise amplifier LNA, in turn followed by a variable-gain amplifier VGA, the gain of which is controlled by the control module CM via a digital-to-analog converter DC1, which supplies a differential voltage Vdiff to the input of the ADC 30. The digital output DO or the filtered digital output DF of the ADC 30, which may comprise the reception control pulse RP, is supplied to a control module CM, which, as has been said, is configured for computing the distance L from the object on the basis of the time of flight of the ultrasound pulse between the transmitter 20 and the receiver 53.

Consequently, the advantages of described embodiments emerge clearly. For example, some embodiments make it possible to render the circuit flexible and efficient in its performance both for high currents and for low currents using the same circuitry. Some embodiments of the present invention affords the following advantages: symmetry independent of the external components, in particular on account of the independence from the threshold voltages of the transistors; good accuracy; compact implementations; and additional functions for control of overlap and shape of the current.

Without prejudice to the underlying principles, the details of construction and the embodiments may vary, even significantly, with respect to what has been illustrated herein purely by way of non-limiting example, without thereby departing from the sphere of protection, as this is defined by the annexed claims.

What is claimed is:

1. An ultrasound transmitter device, comprising:
   a center tap transformer comprising a primary winding having a central terminal coupled to a first node configured to provide a dc voltage, and a secondary winding configured to be coupled to a piezoelectric transducer;
   a plurality of transistors coupled to the primary winding of the center tap transformer and to a ground terminal via a sense resistor;
   an amplifier having an output coupled to control nodes of the plurality of transistors, a first input coupled to the sense resistor, and second input coupled to a reference resistor;
   a switching circuit configured to alternately couple control nodes of the plurality of transistors to an output of amplifier and to a reference node via complementary pulse signals, wherein the switching circuit is configured to turn on and turn off the plurality of transistors and operate the plurality of transistors in a push-pull manner; and
   a digital-to-analog converter having an output coupled to the reference resistor.

2. The device according to claim 1, wherein the dc voltage is a battery voltage.

3. The device according to claim 1, wherein the plurality of transistors comprise MOSFET transistors.

4. The device according to claim 1, wherein the switching circuit comprises respective switches coupled between the output of the amplifier and the control nodes of the plurality of transistors, wherein the complementary pulse signals are configured to be supplied as control signals for the respective switches.

5. The device according to claim 1, wherein the switching circuit further comprises an overlap control circuit configured to provide the complementary pulse signals, wherein the complementary pulse signals comprise overlapping time intervals in which the complementary pulse signals have a same logic value corresponding to a closed state of the respective switches.

6. The device according to claim 1, further comprising the piezoelectric transducer coupled to terminals of a secondary output winding of the center tap transformer.

7. An ultrasonic obstacle detector comprising the ultrasound transmitter device according to claim 6.

8. A method for controlling an ultrasound transmitter device comprising a center tap transformer having a primary winding having a central terminal coupled to a first node configured to provide a dc voltage; a piezoelectric transducer coupled to terminals of a secondary output winding of the center tap transformer; a plurality of transistors coupled to the primary winding of the center tap transformer and to a ground terminal via a sense resistor; an amplifier having an output coupled to control nodes of the plurality of transistors, a first input coupled to the sense resistor, and second input coupled to a reference resistor; and a digital-to-analog converter having an output coupled to the reference resistor, the method comprising:
   turning on and off the plurality of transistors by alternately coupling control nodes of the plurality of transistors to an output of amplifier and to a reference node via complementary pulse signals, wherein the plurality of transistors are operated in a push-pull manner; and
   applying a digital value to an input of the digital-to-analog converter to provide a controlled current value flowing in the piezoelectric transducer.

9. The method according to claim 8, wherein applying the digital value to the input of the digital-to-analog converter comprises applying a plurality of different digital signal values to the input of the digital-to-analog converter over a period of time.

10. The method according to claim 8, wherein the complementary pulse signals overlap such that the plurality of transistors are simultaneously on during an overlap period.

11. The method of claim 8, wherein alternately coupling the control nodes of the plurality of transistors to the output of amplifier comprises applying the complementary pulse signals to a plurality of switches coupled between the output of the amplifier and the control nodes of the plurality of transistors.

12. A circuit, comprising:
a piezoelectric transducer;
a transformer having a secondary winding coupled to the piezoelectric transducer;
a sense resistor having a first terminal coupled to power supply node;
a reference resistor having a first terminal coupled to the power supply node;
a first transistor having a load path coupled between a first terminal of a primary winding of the transformer and a second terminal of the sense resistor;
a second transistor having a load path coupled between a second terminal of the primary winding of the transformer and the second terminal of the sense resistor;
an amplifier having a first input coupled to the second terminal of the sense resistor, and a second input coupled to the second terminal of the reference resistor;
a first switch coupled between an output of the amplifier and a control node of the first transistor;
a second switch coupled between the output of the amplifier and a control node of the second transistor; and
a current generating circuit coupled to the second terminal of the reference resistor.

13. The circuit of claim 12, wherein the current generating circuit is a current digital-to-analog converter.

14. The circuit of claim 12, further comprising a signal generator configured to provide a first pulse signal to the first switch and a second pulse signal to the second switch, wherein the first pulse signal and the second pulse signal are complementary.

15. The circuit of claim 14, wherein the signal generator comprises an overlap control circuit configured to cause a portion of the first pulse signal and the second pulse signal to overlap each other.

16. The circuit of claim 12, wherein a resistance of the reference resistor is an integer multiple of a resistance of the sense resistor.

17. The circuit of claim 12, wherein the primary winding of the transformer comprises a center tap coupled to a reference node.

18. The circuit of claim 17, wherein the reference node is configured to be coupled to a battery.

19. The circuit of claim 12, wherein the power supply node is a ground node.

20. The circuit of claim 12, wherein the first transistor and the second transistor comprise MOSFETs.

* * * * *